United States Patent [19]
Gregory

[11] 3,774,881
[45] Nov. 27, 1973

[54] VALVE ASSEMBLY
[76] Inventor: Jerome P. Gregory, 711 Easlan Dr., Plover, Wis. 54467
[22] Filed: July 12, 1972
[21] Appl. No.: 262,081

[52] U.S. Cl.............................. 251/335, 251/368
[51] Int. Cl............................................. F16k 41/04
[58] Field of Search ...................... 251/335 B, 368

[56] References Cited
UNITED STATES PATENTS

| | | |
|---|---|---|
| 3,251,575 | 5/1966 | Campbell et al................ 251/368 X |
| 2,851,054 | 9/1958 | Campbell et al................ 251/368 X |
| 2,331,503 | 10/1943 | Ray .................................. 251/335 B |
| 2,595,671 | 5/1952 | Greene .......................... 251/368 X |
| 2,628,638 | 2/1953 | Herod et al. ..................... 251/335 B |
| 2,743,738 | 5/1956 | Johnson .......................... 251/335 B |
| 3,573,863 | 4/1971 | Doors et al...................... 251/335 B |
| 3,658,290 | 4/1972 | Peters et al. .................... 251/368 X |

Primary Examiner—Samuel Scott
Attorney—Ralph F. Merchant et al.

[57] ABSTRACT

A valve assembly of an expandable bellows type construction in which the bellows are constructed entirely from glass. A rotatable shaft extends axially within the glass bellows to engage a closed end thereof for urging the closed end, upon rotation of the shaft, against an outlet or valve seat in a gas flow conduit. Utilization of a plurality of such glass valves in a manifold assembly is also disclosed.

7 Claims, 5 Drawing Figures

PATENTED NOV 27 1973 3,774,881

VALVE ASSEMBLY

BACKGROUND OF THE INVENTION

1. Field of the Invention

The present invention pertains to valving assemblies, particularly to valving assemblies of a bellows type construction.

2. Discussion of the Prior Art

Numerous different types of valves are commercially available for use in controlling the flow of a fluid through a conduit. Particularly in chemical installations and the like, the fluid being controlled is often times extremely corrosive and at very high vacuum. This necessitates the utilization of an inert material in the construction of the exposed parts of the valving assembly as well as a design which provides an extremely tight seal so as to maintain the desired vacuum.

To provide the above-mentioned features, two types of valving assemblies are most commonly utilized in chemical installations; i.e., tapered plug valves commonly referred to as stopcocks and valve assemblies of a bellows type construction. The stopcocks presently available are commonly constructed from glass and lubricated to provide the proper freedom of movement between the plug and the valve body. Alternatively, the stopcocks are constructed from a material which requires no lubrication to move freely relative to the glass valve body. See, for example, the stopcock assembly disclosed and claimed in U. S. Pat. No. 3,195,856. Valves of a bellows-type construction are available wherein the bellows are constructed from a metal or a flexible material such as tetrafluoroethylene. Typically, the bellows are expandable by rotation of a shaft extending axially through the bellows and which engages a plug attached to the bellows for seating against an orifice in a conduit. See, for example, the valve construction disclosed and claimed in U. S. Pat. No. 3,251,575.

While techniques have been developed to render both stopcock and bellows-type valves sealable to a relatively high degree, the success of such valves have not been as great as is desirable. For instance, the utilization of a lubricant to provide the necessary lubrication for operation of a glass stopcock frequently results in contamination of a high vacuum system. Alternatively, the utilization of a non-glass material typically renders the stopcock susceptible to corrosion by a greater number of chemicals. Similarly, the bellows-type valves presently available are either highly susceptible to corrosion or do not provide as reliable seating as is desired. Finally, while O-rings constructed from various materials have been utilized for valving and sealing purposes, they do not provide sufficiently tight sealing to allow their use in high vacuum systems. Thus, a highly inert valving assembly which provides a tight and reliable seal is commercially desirable.

SUMMARY OF THE INVENTION

The present invention provides a valving assembly comprising a glass bellows preferably having a generally cylindrical shape. The bellows include a first end portion which is fixedly positionable with respect to an orifice or valve seat and a second end portion which is moveable toward and away from the orifice. Plug means are associated with the second end portion and moveable therewith to seat against the orifice thereby controlling fluid flow therethrough. Means for operating the bellows are provided, preferably in the form of a rotatable shaft which extends axially within the bellows so as to engage the second end portion. Upon rotation of the shaft, the glass bellows are expandable to move the second bellows end portion and associated plug means toward and away from the valve seat.

As will be readily appreciated from a reading of the Detailed Description which follows, the present glass valve is accurately adjustable and provides a highly tight seal when in its closed position. Since the entire valving assembly is constructed from glass, it is entirely inert to most corrosive gases. Finally, as will become apparent, the valve assembly is relatively inexpensive to manufacture and construct.

DETAILED DESCRIPTION OF THE PREFERRED EMBODIMENTS

Figure 1:
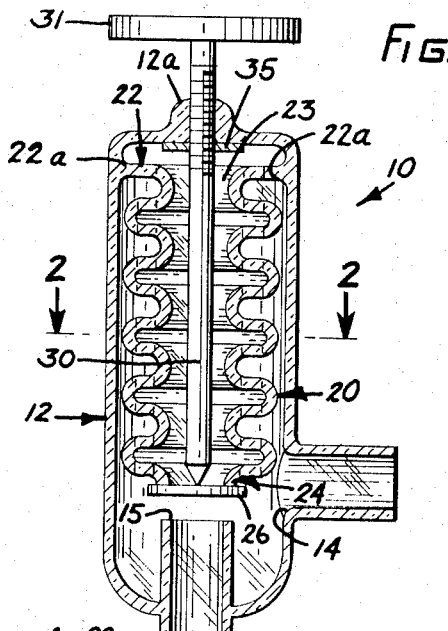
FIG. 1 is an axial cross section of the valve assembly provided by the present invention.
Figure 2:
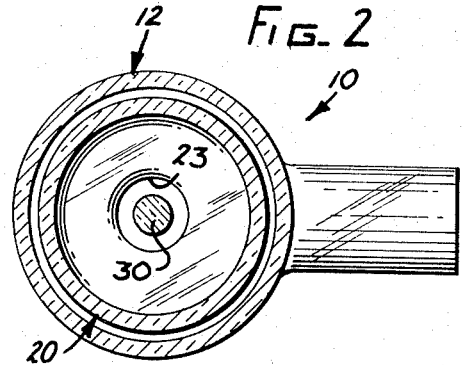
FIG. 2 is a transverse cross sectional view along the line 2—2 of FIG. 1.

Referring particularly to FIGS. 1 and 2, the valving assembly provided by the present invention is generally designated 10. As will become apparent from the following description, the entire valving assembly 10 can, if desired, be constructed from glass. In any case, the present invention contemplates utilization of glass in the construction of the portions of valving assembly 10 exposed to fluid flow.

As shown, valving assembly 10 includes a glass chamber 12 having an inlet orifice 14 and an outlet orifice or valve seat 15. Inlet orifice 14 is connectable to a source of fluid (not shown) such as a highly corrosive gas which may be utilized in any number of chemical installations. Outlet orifice 15 is suitable for exhausting the fluid introduced into glass chamber 12 through the inlet 14.

Figure 3:
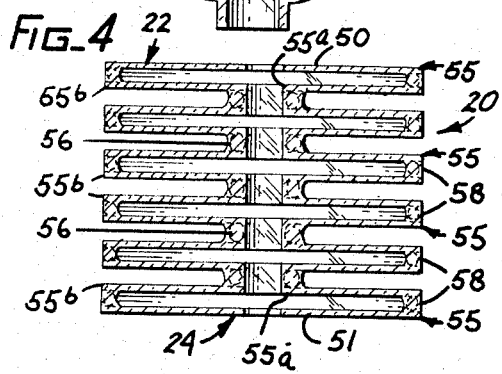
FIG. 3 is an enlarged cross sectional view of the cylindrical glass bellows utilized in the present invention.

Positioned within chamber 12 is a generally cylindrically shaped bellows 20 which is constructed entirely from glass in the manner subsequently described. A first end 22 of bellows 20 is fixedly attached to chamber 12 by integrally bonding or fusing a peripheral end portion 22a of end 22 to the inner wall of chamber 12. End 22 defines a centrally positioned opening 23 therein. A second end 24 of bellows 12 is moveable within chamber 12 toward and away from outlet orifice 15. Plug means in the form of a circular glass plate 26 is integrally fused to second bellows end 24 and is moveable therewith for seating against outlet orifice 15 to control the flow of fluid therethrough. Alternatively, second bellows end 24 can be entirely closed (such as shown in FIG. 3) and formed so as to define a surface for seating against orifice 15 thereby eliminating the necessity for separate plug means 26. Additionally, it should be understood that the valving assembly 10 can be designed so that bellows 20 seats against inlet orifice 14 rather than outlet 15.

Means for operating bellows 20 are shown in the form of a rotatable valve stem or shaft 30 extending through central opening 23 in first bellows end 22 and then axially within bellows 20 to engage the glass plug 26. An internally threaded nub portion 12a of glass chamber 12 threadedly receives shaft 30 and, upon axial movement of shaft 30 by rotation of a handle 31 connected thereto, the bellows 20 can be controllably expanded and contracted so as to cause plug means 26 to move toward and away from, respectively, outlet 15. A seal, such as an O-ring 35, can be utilized to seal shaft 30 within chamber 12, but this is unnecessary to the operation of the present invention. It should be understood that since shaft 30 is not exposed to the corrosive fluid flowing through chamber 12, shaft 30 does not necessarily have to be constructed from glass or a similar inert material.

Two alternative methods of constructing glass bellows 20 are described below. However, it should be understood that numerous techniques are available for constructing such bellows and it is not my intent to be limited to the utilization of glass bellows which are constructed by either of the following construction methods.

As can be seen best in FIG. 3, a first method of constructing bellows 20 entails the utilization of a plurality of circular glass plate members 40 positioned in a parallel, spatially separated relationship. The center portion 40a of each of the circular plates 40 is integrally fused to a first adjacent one of the plurality of plates 40 and the peripheral portion 40b of each of the plates 40 is integrally fused to a second adjacent one of the circular plates. The integrally fused center portions 40a are then drawn out or drilled so as to define an opening 42 therethrough for receiving the rotatable shaft 30. In constructing bellows 20 in this manner, a disc-like separator (not shown) can be utilized to maintain a first pair of the plates 40 a fixed distance apart so as to allow fusing of the two center portions 40a utilizing a carbon rod (or other heat source) and conventional fusing techniques. The center portions 40a of a second pair of plates 40 are then fused and so on until each of the plates 40 has been integrally bonded at its center to another one of the plates. Preferably, the center opening 42 is drilled or punched in each of the mated pairs of plates 40 at this point in the construction method. A separator is then positioned between two pairs of centrally fused plates 40 and the peripheral portion 40b of two adjacent plates each from a different one of the pairs are then integrally fused together. This process of fusing together the peripheral portion 40b of adjacent plates in different ones of the pairs of centrally fused plates is continued until all of the pairs have been fused together to form the bellows shown in FIG. 3.

Figure 4:
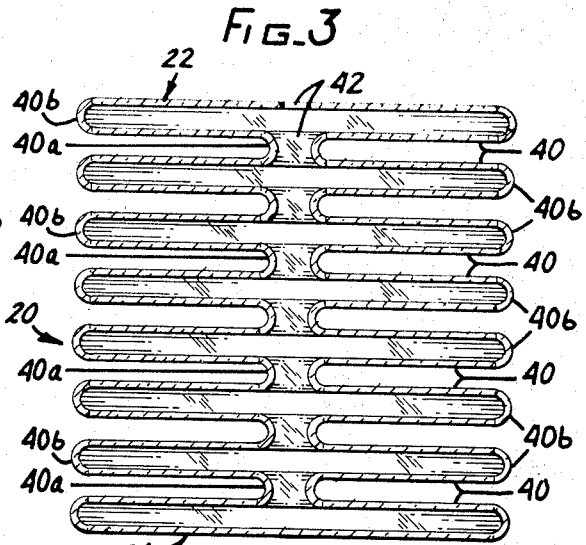
FIG. 4 is an axial cross sectional view of an alternative bellows construction.

Alternatively, glass bellows 20 can be constructed in a manner best understood from FIG. 4 utilizing a first circular glass plate member 50 to define first bellows end 22, a second circular glass plate member 51 to define second bellows end 24, and a plurality of semi-circular plate members 55 positioned in a parallel spatially separated relationship between the circular end plates 50 and 51. As shown, the diameter portion 55a of each of the semi-circular plates 55 is integrally fused to a first adjacent one of the plates 55 and the peripheral portion 55b of each of the plates 55 is integrally fused to a second adjacent one of the semi-circular plates. The two oppositely positioned, outermost ones of the semi-circular plates 55 are integrally fused to a different one of the first and second circular end plates 50 and 51, respectively. Preferably, the semi-circular plates 55 are fused together utilizing a plurality of annular glass rings 56 of a first diameter and a plurality of annular glass rings 58 of a second diameter larger than the first diameter. The smaller glass rings 56 are first integrally fused to the diameter portion 55a of adjacent plates in alternating pairs (i.e. every other pair) of semi-circular plates 55. The larger glass rings 58 are then integrally fused to the peripheral portion 55b of the plates in adjacent ones of the centrally fused pairs of plates (i.e. to alternating pairs of the adjacent glass plates 55 opposite from the pairs fused together by the smaller glass rings 56). The fusing of the rings 56 and 58 to the semi-circular glass plates 55 can be accomplished by using conventional fusing techniques. The circular end plates 50 and 51 are similarly fused to the outermost ones of the semi-circular plates 55 using the larger rings 58. Preferably, bellows 20 are annealed prior to installation in glass chamber 12 utilizing conventional annealing techniques.

The thickness of the glass utilized to construct bellows 20 is not critical to the present invention with the exception that the glass utilized must be sufficiently thin to remain flexible (i.e. to allow the desired expansion and contraction), yet of sufficient strength to withstand the forces exerted thereon over extended periods of operation. For example, glass having a thickness within the range of about 0.01–0.05 cm. can be utilized, but depending on the bellows design, other thicknesses can also be utilized. Similarly, the diameter of the cylindrically shaped bellows 20 can vary dependent upon the limitations imposed by constructional and applicational parameters. Finally, the spacing between adjacent ones of the plates comprising the bellows 20 can vary from, for example, about 0.075 mm. to 1.5 mm., but this thickness is not critical to the present invention.

Figure 5:
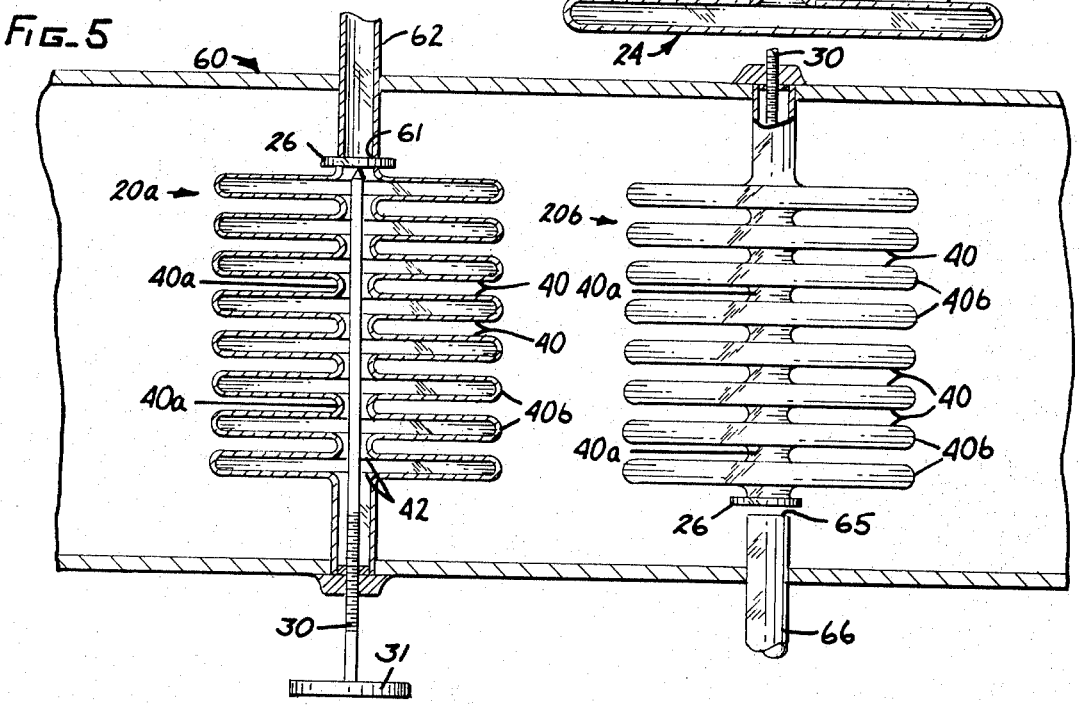
FIG. 5 shows the utilization of a plurality of the present valving assemblies in a gas flow manifold, portions thereof being broken away.

In FIG. 5, a plurality of bellows valving assemblies 20a and 20b are utilized to control fluid flow through a manifold arrangement 60. As shown, manifold 60 includes an orifice 61 (e.g. a first inlet orifice) in a glass conduit 62 having the fluid flow therethrough controllable by bellows valve 20a. As shown, bellows valve 20a is in its fully closed position wherein the glass plug member 26 is seated against orifice 61 providing a tight glass-to-glass seal. By rotation of handle 31 and connected shaft 30, the outward force applied to glass plug 26 by shaft 30 can be reduced resulting in the bellows 20a contracting and moving away from orifice 61. Glass bellows 20b function similarly to control fluid flow through an orifice 65 (e.g. a second inlet orifice) in a glass conduit 66. As can be readily appreciated, the bellows valves 20a and 20b are identical to the bellows valves previously described with the exception that the valving chamber 12 is no longer utilized. It should also be understood, that any number of the present valving assemblies can be utilized in manifold 60 to control the ingress and egress of a fluid.

The present invention having been described in conjunction with a particularly preferred form of my invention, it is my intent to be limited solely by the spirit and scope of the appended claims.

I claim:

1. A valve assembly for controlling the flow of a fluid through an orifice in a conduit, comprising:

a. an expandable and contractible, essentially glass bellows having a first end portion fixedly positionable with respect to the orifice and a second end portion moveable toward and away from the orifice, the surfaces of said bellows exposed to fluid flow consisting of a continuous solid glass surface;

b. plug means associated with said second end portion and moveable therewith for seating against the orifice; and c. means for operating said bellows to move said second end portion and said associated plug means toward and away from the orifice.

2. The valve assembly of claim 1 wherein:

a. said essentially glass bellows consists entirely of glass and is generally cylindrically shaped;

b. said first end portion of said glass bellows defines an opening generally centrally positioned therein;

c. said means for operating said bellows includes a rotatable shaft extending through said opening in said first end portion of said bellows and extending generally axially within said bellows so as to engage said second end portion.

3. The valve assembly of claim 2 wherein:

a. said second end portion of said glass bellows is entirely closed; and b. said plug means is defined by said second end portion of said bellows.

4. The valve assembly of claim 2 including a glass chamber having an inlet orifice and an outlet orifice, wherein:

a. said inlet orifice is connectable to a source of fluid and said outlet orifice is suitable for exhausting the fluid introduced into said glass chamber;

b. said first end portion of said glass bellows is fixedly attached to said glass chamber; and c. said second end portion of said glass bellows is moveable toward and away from one of said inlet and outlet orifices to control the flow of fluid therethrough.

5. The valve assembly of claim 4 wherein said glass bellows includes a plurality of circular glass members positioned in a spatially separated relationship having the center portion of each of said plates integrally fused to a first adjacent one of said plates and the peripheral portion of each of said plates integrally fused to a second adjacent one of said plates, said integrally fused center portion defining an opening therethrough for receiving said rotatable shaft.

6. The valve assembly of claim 4 wherein said glass bellows includes: a spaced apart array of spaced apart pairs of circular plate members, each pair being integrally fused together at the paired peripheries of said circular plate members, and each two adjacent pairs being integrally fused together at relatively central portions of the adjacent circular plate member of each two adjacent pairs.

7. The valve assembly of claim 6 including a plurality of outer glass rings fused to each pair at said paired peripheries and an inner glass ring fused to the said relatively central portions of the adjacent circular plate members of each two adjacent pairs.

* * * * *